Feb. 18, 1936.   J. J. SCHWERAK   2,031,008
APPARATUS FOR EXTRUDING METAL
Filed Dec. 24, 1934   2 Sheets-Sheet 2
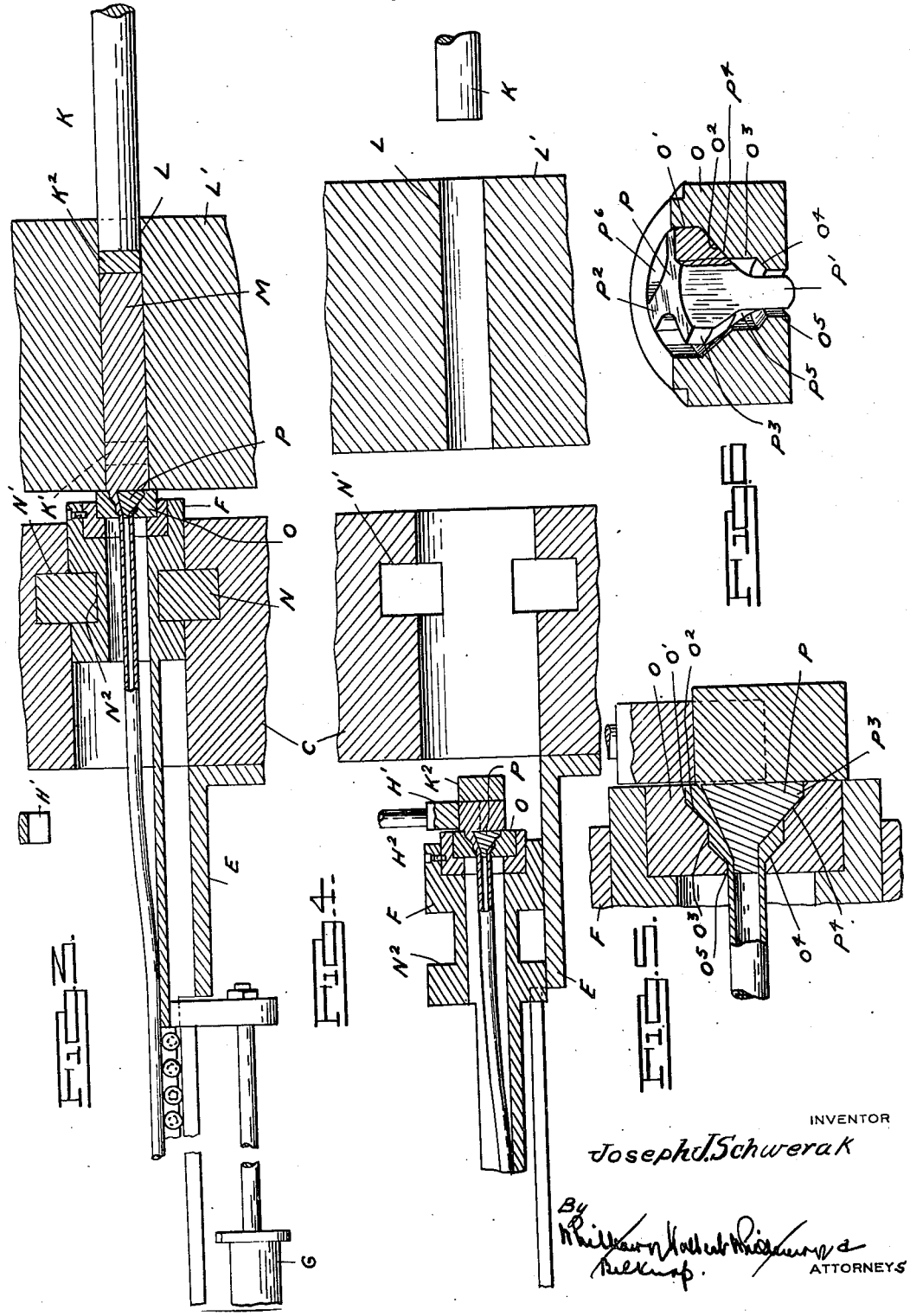
INVENTOR
Joseph J. Schwerak
ATTORNEYS Patented Feb. 18, 1936

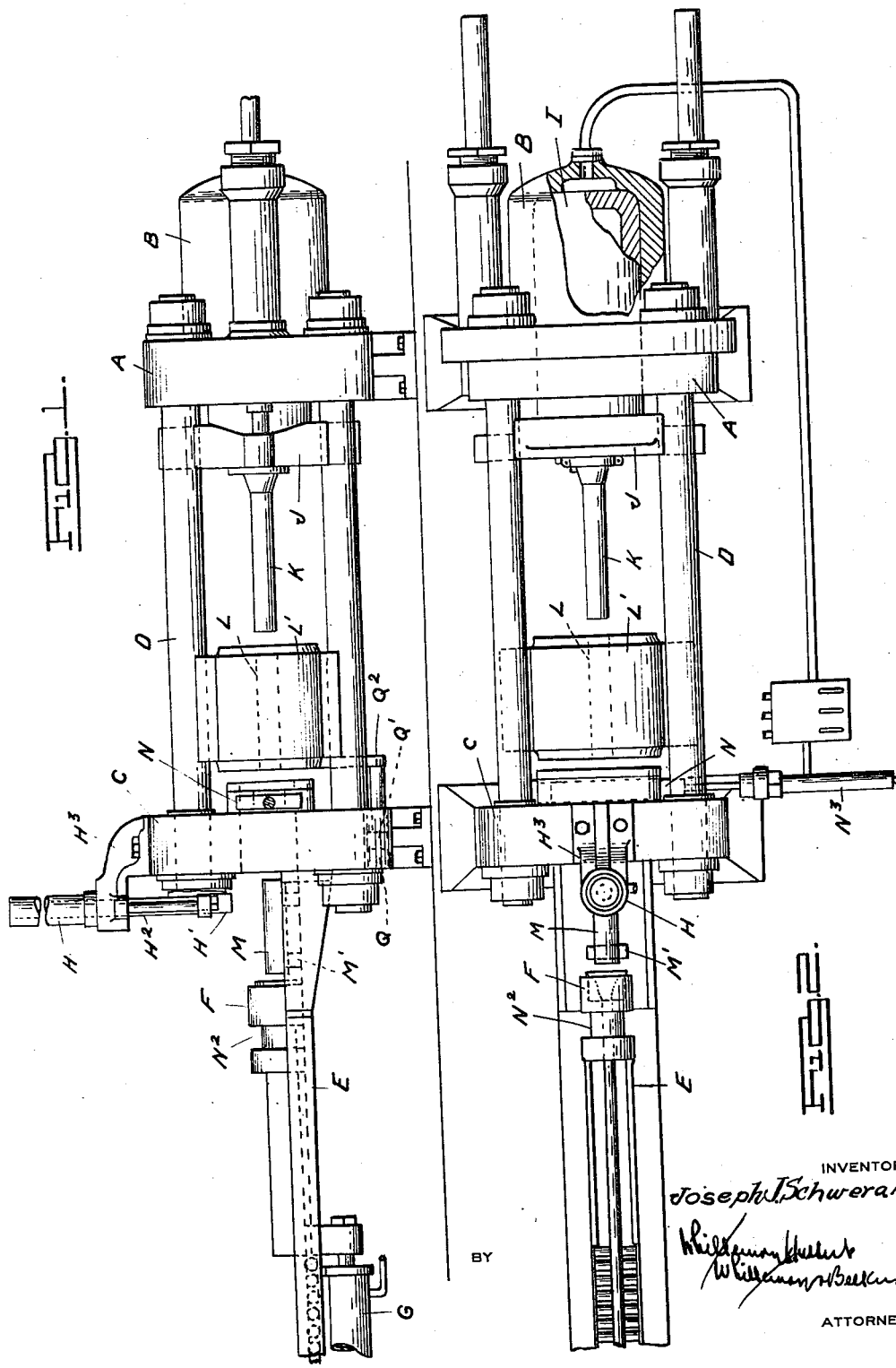

2,031,008

UNITED STATES PATENT OFFICE 2,031,008

APPARATUS FOR EXTRUDING METAL

Joseph J. Schwerak, Detroit, Mich., assignor to Bohn Aluminum & Brass Corporation, Detroit, Mich., a corporation of Michigan Application December 24, 1934, Serial No. 759,106

4 Claims. (Cl. 207—17)

The invention relates to means for extruding metal and more particularly for the extrusion of seamless metal. Among the objects of the invention are, first, to provide for the extrusion of continuous tubing from successive unpierced billets of metal; second, to exclude from the extruded tubing any portion of the billet containing impurities or otherwise undesirable for use; third, to obtain a construction of apparatus which permits of quickly removing such undesirable portions of the billet and for the insertion of a successive billet for continuing the extrusion process without interrupting the continuity of the product. With these and other objects in view the invention consists in the apparatus as hereinafter set forth.

In the drawings:

Fig. 1 is a side elevation of my improved extruding machine;

Fig. 2 is a plan view thereof;

Fig. 3 is a longitudinal section showing the operation of extruding the billet to form the tube;

Fig. 4 is a similar view illustrating the operation of shearing off the stub end of the billet from the extruded portion thereof;

Fig. 5 is an enlarged view of Fig. 4 showing the dies and shearing means;

Fig. 6 is a sectional perspective view of the dies.

Heretofore seamless tubing has been formed by the extrusion of unpierced billets of metal, but the length of tubing thus formed is limited by the amount of metal in a single billet. This is for the reason that during the flow of metal under pressure any impurities contained in the billet are concentrated in the butt end thereof so that this portion is undesirable for use. With my improved process and apparatus the butt end of the billet is cut off from the portion of the extruded tubing still in the die so that by continuing the operation with another billet, the metal will weld on to the metal in said die and will continue the extrusion without break. Thus any desired length of continuous tubing may be produced and all portions will be of uniform quality.

In general construction, my improved apparatus includes a suitable frame shown as comprising a head A with an hydraulic cylinder B mounted thereon, a second head C spaced from the head A and rigidly connected therewith by the parallel rods D, an extension E of the frame beyond the head C on which is slidably mounted a head F adapted to be reciprocated towards or from the head C by an hydraulic cylinder G and an hydraulic cylinder H mounted on the head C with its axis transverse to the axes of the cylinders B and G. The cylinder B contains a piston I which is connected to the cross head J slidably mounted on the rods D, and this cross head has mounted thereon the extrusion plunger K. L is an open-ended cylinder mounted in a second cross head L', the latter being slidably mounted upon the rods D and with the axis of the cylinder in alignment with the plunger K. This cylinder is adapted to receive the heated billet to be extruded which is introduced therein from the left, (as shown in the drawings), while the plunger enters from the right end. The extrusion dies are carried by the head F which is withdrawn to the left when the billet is to be introduced and is then returned into a position adjacent to the cylinder L. The billet M is placed upon supporting blocks M' slidably resting on the extension E of the frame. These blocks hold the billet in aixal alignment with the cylinder L so that during the return movement of the head F, said billet will be moved into the cylinder. The head F is then locked in rigid relation to the head C by a transversely movable bifurcated locking member N which engages registering grooves N', N² in the heads C and F. This locking member N may be actuated by an hydraulic cylinder N³ or any other suitable means.

The construction of the die through which the metal is extruded is an important part of my improvement. This includes a female die member O located in a recess within the head F and having a cylindrical opening O' therein. Within the die O beyond the portion O' is a conical portion O², preferably at an angle substantially at 45° to the axis of the opening. Beyond this a cylindrical portion O³ of smaller diameter terminating in another conical portion O⁴ and finally a cylindrical portion O⁵ of still smaller diameter and corresponding to the external diameter of the tube to be extruded. Within the die member O is another die member P having a cylindrical mandrel portion P' corresponding to the internal diameter of the tube to be extruded. This mandrel is held concentric within the die O by a plurality of wing members P² preferably three in number, equi-spaced around the circle. These wing members are fashioned with a portion P³ for fitting within the circle O', an oblique portion P⁴ for seating upon the conical portion O² of the die member O and a portion P⁵ which gradually merges into the mandrel P'. Between the wings P² are segmental recesses P⁶ into which the metal of the billet is forced by the extruding pressure thereon and which lead into the cylindrical portions O³ and O⁵ which completely surround the mandrel. By reason of the conical portion O² the cross section of the recesses P⁶ is gradually diminished, while it is still further diminished in the portions O³ and O⁵. Thus the several separate streams of metal flowing into the recesses P⁶ will be united and welded to each other before the tube is extruded from the portion O⁵ and mandrel P'.

With the construction as just described it will be observed that the end of the die members O and P adjacent to the cylinder L is in a plane perpendicular to the axis of the cylinder so that by severing in this plane, the butt end of the billet may be removed from the three separate portions that are in the recesses P⁶. This avoids the imbedding of the die member P in the extruded metal so that at any time by shearing off the extruded tube adjacent to the end of the mandrel P', the die member P may be removed from the die member O, whereupon the several sections of extruded metal in the recess P⁶ may be removed therefrom.

In extruding a billet of heated metal the butt end is the portion of poorest quality while during the extrusion operation certain impurities in the body of the billet are forced into this butt end. It is therefore undesirable to completely extrude all of the metal of the billet, as this would result in a poor quality portion of the tube. To avoid such result, the plunger K is not moved completely through the cylinder L but is stopped at a point indicated by the dotted line K', Fig. 3. A dummy block K² is placed between the forward end of the plunger K and the billet and after the completion of the movement of the latter, the cylinder L is withdrawn from the stub end of the billet and the dummy block K², preferably by an hydraulic cylinder Q, the piston Q' of which is attached by an arm Q² to the carriage L'. Thus the carriage can be slid back upon the rods D so that the cylinder will be disengaged from the billet. The head F is then moved by the operation of the cylinder G to the position shown in Fig. 4 where the stub end of the billet is aligned with a shearing member H' operated by the piston H² in the cylinder H previously described, said cylinder being supported on the head C by a bracket H³. The cylinder H is then operated to depress the shear H', thereby severing the billet from the metal in the dies in the plane of the rear end of the die members O and P. After this is accomplished, the head F is moved further to the left and a new heated billet M is placed upon the blocks M' to be aligned with the cylinder L. The head F is then returned by operation of the cylinder G and the cylinder L is also returned to normal position by the operation of the cylinder Q. This places the heated billet M within the cylinder L adjacent to the dies O and P after which the plunger K is again actuated to extrude the billet, welding the forward end thereof on to the metal in the dies so as to form a continuous tube without break.

The apparatus is more particularly designed for forming tubing of aluminum and aluminum alloys, but it may also be used for other metals. The billets are heated to a temperature from 800° to 1000° F., at which temperature the metal will flow under the enormous pressure of the plunger K.

To form tubing having its walls of uniform thickness it is necessary that the mandrel should be accurately centered within the portion of the die that forms the external surface of the tube. This I have accomplished by supporting and centering the mandrel P' through the wings P² which latter are centered in the cylindrical recess O' while the thrust is carried by the oblique portions P⁴ engaging the conical surface O² of the die member O. The construction is also one which as previously described has the rear ends of the members O and P in a common plane. Thus when the stub end of the billet is sheared off the several streams of metal in the recesses P⁶ will be separate from each other and will be in a condition to weld on to the forward end of the new billet. Also by severing immediately adjacent to the die, this may be returned in operative relation to the billet holding cylinder, as would not be the case if any portion of the stub end were allowed to remain. This is for the reason that the high pressure to which the metal is subjected while in the cylinder will cause the stub end to expand slightly in diameter when removed from the cylinder which would preclude re-insertion of the same into the cylinder.

What I claim as my invention is:

1. In an apparatus for extruding unpierced metal billets to form tubing, a die member having a tapering recess terminating in a cylindrical portion of smaller diameter, a cylindrical mandrel of still smaller diameter within the cylindrical portion of said recess and a plurality of supporting and centering wings for said mandrel extending from the mouth of said recess and removably seated upon the tapering wall thereof, the ends of said wings being flush with the mouth of said recess and dividing the space in the entering portion thereof into separate segments terminating in a common plane.

2. In an apparatus for extruding unpierced metal billets to form tubing, a die having an opening therethrough formed with a cylindrical mouth portion, a conical tapering portion and a cylindrical portion of reduced diameter, a cylindrical mandrel concentrically arranged within the cylindrical portion of reduced diameter and provided with rearwardly extending wings being removably seated on said conical portion and large cylindrical portion of said die dividing the space within the conical portion and cylindrical mouth portion of said opening into separate segments with the ends of said wings flush with the mouth of the die, said wings serving to center and support said mandrel and in cooperation with the conical portion of said die resisting the thrust of the billet.

3. In an apparatus for extruding unpierced metal billets to form tubing, a die member having an opening therethrough formed successively with a cylindrical mouth portion, a conical tapering portion, a cylindrical portion of smaller diameter, a second conical tapering portion and a cylindrical portion of still smaller diameter corresponding to the external diameter of the tube to be extruded, a removable mandrel concentrically arranged within the latter portion and of a diameter corresponding to the inner diameter of the tube to be extruded, and a plurality of wings extending rearward and outward from said mandrel in the cylindrical mouth portion and adjacent conical portion of said opening being seated against the walls thereof and dividing the space therein into separate segments, the ends of said wings and mouth of said die being in the same plane.

4. In an apparatus for extruding unpierced metal billets to form tubing, a cylinder to receive the billet, a head movable relative to said cylinder in the direction of the axis thereof from a position adjacent thereto to a position removed therefrom, a die member seated in said head having a tapering opening therethrough terminating in a cylindrical portion corresponding to the external diameter of the tube to be extruded, a mandrel concentrically arranged within said cylindrical portion and corresponding in diameter to the internal diameter of the tube to be extruded, a plurality of wings extending rearward and outward from said mandrel and removably seated in the tapering portion of said opening to divide the space thereof into separate segments, the ends of said wings being flush with the end of the die, a plunger engaging said cylinder to extrude the billet therein through said die, leaving an unextruded stub end and means operating in the retracted position of said head for severing the stub end of said billet from the separate streams of metal within the die.

JOSEPH J. SCHWERAK.